US009254825B2

United States Patent
Lee et al.

(10) Patent No.: US 9,254,825 B2
(45) Date of Patent: Feb. 9, 2016

(54) REGENERATIVE BRAKING CONTROL SYSTEM AND METHOD

(71) Applicant: FORD GLOBAL TECHNOLOGIES, LLC, Dearborn, MI (US)

(72) Inventors: Jinkoo Lee, Ann Arbor, MI (US); Dale Scott Crombez, Livonia, MI (US); Daniel A. Gabor, Canton, MI (US); Scott J. Lauffer, Northville, MI (US); John P. Joyce, West Bloomfield, MI (US)

(73) Assignee: Ford Global Technologies, LLc, Dearborn, MI (US)

( * ) Notice: Subject to any disclaimer, the term of this patent is extended or adjusted under 35 U.S.C. 154(b) by 47 days.

(21) Appl. No.: 14/153,048

(22) Filed: Jan. 12, 2014

(65) Prior Publication Data

US 2015/0197227 A1    Jul. 16, 2015

(51) Int. Cl.
*B60L 7/18* (2006.01)
*B60L 7/16* (2006.01)
(Continued)

(52) U.S. Cl.
CPC .............. *B60T 11/103* (2013.01); *B60L 7/12* (2013.01); *B60L 7/18* (2013.01); *B60L 7/22* (2013.01);
(Continued)

(58) Field of Classification Search
CPC .............. B60L 7/18; B60L 7/16; B60T 1/10; B60T 13/586; B60T 8/1755; B60T 7/042; B60T 8/4081; B60K 6/46; B60K 6/365
USPC .......... 701/70, 22, 54; 303/3, 9.63, 151, 6.01; 188/159
See application file for complete search history.

(56) References Cited

U.S. PATENT DOCUMENTS

| 2004/0054450 A1* | 3/2004 | Nakamura | B60L 7/16 701/22 |
| 2007/0222287 A1* | 9/2007 | Crombez | B60L 7/18 303/151 |

(Continued)

FOREIGN PATENT DOCUMENTS

| CN | 202608748 U | 12/2012 |
| JP | H05184007 A | 7/1993 |
| JP | 3876605 B2 | 2/2007 |

OTHER PUBLICATIONS

Test Vehicle for Regenerative Braking Emulation, http://publications.lib.chalmers.se/records/fulltext/141002.pdf.

*Primary Examiner* — Tuan C. To
*Assistant Examiner* — Yuri Kan
(74) *Attorney, Agent, or Firm* — David Kelley, Esq.; Tung & Associates

(57) ABSTRACT

A vehicle regenerative braking control system includes a brake pedal; a brake pedal angle sensor interfacing with the brake pedal; a vehicle braking system interfacing with the brake pedal angle sensor, the vehicle braking system adapted to implement friction braking and regenerative braking responsive to receiving a brake pedal angle input signal from the brake pedal angle sensor; and at least one of a brake pedal switch and a brake master cylinder pressure sensor interfacing with the brake pedal and the vehicle braking system. The vehicle braking system is further adapted to implement friction braking and regenerative braking responsive to input from the at least one of a brake pedal switch and a brake master cylinder pressure sensor in the event that the vehicle braking system does not receive the brake pedal angle input signal from the brake pedal angle sensor. A regenerative braking control method is also disclosed.

18 Claims, 3 Drawing Sheets

(51) Int. Cl.

| | | |
|---|---|---|
| *B60T 11/10* | (2006.01) | |
| *B60T 7/04* | (2006.01) | |
| *B60T 11/16* | (2006.01) | |
| *B60L 7/12* | (2006.01) | |
| *B60L 7/22* | (2006.01) | |
| *B60L 15/20* | (2006.01) | |
| *B60T 1/10* | (2006.01) | |
| *B60T 13/58* | (2006.01) | |

(52) U.S. Cl.
CPC ............... *B60L 15/2009* (2013.01); *B60T 1/10* (2013.01); *B60T 7/042* (2013.01); *B60T 11/16* (2013.01); *B60T 13/586* (2013.01); *B60L 2240/423* (2013.01); *B60L 2250/26* (2013.01)

(56) References Cited

U.S. PATENT DOCUMENTS

| | | | |
|---|---|---|---|
| 2008/0051965 A1* | 2/2008 | Nakamura | B60T 8/4081 701/70 |
| 2008/0140274 A1 | 6/2008 | Jeon et al. | |
| 2009/0118920 A1* | 5/2009 | Heap | B60K 6/365 701/54 |
| 2010/0006380 A1* | 1/2010 | Futahashi | B60K 6/46 188/159 |
| 2011/0006593 A1* | 1/2011 | Sakai | B60T 8/4081 303/6.01 |
| 2012/0126610 A1* | 5/2012 | Nakata | B60T 1/10 303/9.63 |
| 2013/0076113 A1* | 3/2013 | Pihl | B60T 13/586 303/3 |

* cited by examiner

REGENERATIVE BRAKING CONTROL SYSTEM AND METHOD

FIELD

Illustrative embodiments of the disclosure generally relate to regenerative braking in electric vehicles (EVs). More particularly, illustrative embodiments of the disclosure relate to a regenerative braking control system and method which utilizes brake pedal switch and/or master cylinder pressure input as backup inputs to implement regenerative braking.

BACKGROUND

Automotive Brake-By-Wire (BBW) brake systems may rely on measuring the driver braking input to apportion friction braking and regenerative braking during a braking event. Driver braking input may be performed using a Brake Pedal Angle Sensor (BPAS), which measures the angle of the brake pedal as the operator of a vehicle applies the vehicle brakes. The brake system control module and powertrain control module may control friction braking and regenerative braking based on the brake pedal angle as reported by the BPAS.

In the event that the BPAS inadvertently does not report the brake pedal angle during the braking event, regenerative braking may not be carried out. Consequently, lower energy recovery and emission compliance issues may be compromised.

Accordingly, a regenerative braking control system and method which utilizes brake pedal switch and/or master cylinder pressure input as backup inputs to implement regenerative braking may be desirable.

SUMMARY

Illustrative embodiments of the disclosure are generally directed to a vehicle regenerative braking control system. An illustrative embodiment of the system includes a brake pedal; a brake pedal angle sensor interfacing with the brake pedal; a vehicle braking system interfacing with the brake pedal angle sensor, the vehicle braking system adapted to implement friction braking and regenerative braking responsive to receiving a brake pedal angle input signal from the brake pedal angle sensor; and at least one of a brake pedal switch and a brake master cylinder pressure sensor interfacing with the brake pedal and the vehicle braking system. The vehicle braking system is further adapted to implement friction braking and regenerative braking responsive to input from the at least one of a brake pedal switch and a brake master cylinder pressure sensor in the event that the vehicle braking system does not receive the brake pedal angle input signal from the brake pedal angle sensor.

Illustrative embodiments of the disclosure are further generally directed to a regenerative braking control method. An illustrative embodiment of the regenerative braking control method includes implementing a braking event upon depression of a vehicle brake pedal through at least a portion of a brake pedal torque range; determining availability of a brake pedal angle sensor signal; applying friction braking as the vehicle brake pedal traverses a brake pedal gap corresponding to an initial segment of the brake pedal torque range; obtaining at least one of a brake pedal switch position and a brake master cylinder pressure if the brake pedal angle sensor signal is unavailable; and performing at least one of parallel regenerative braking and friction braking after the vehicle brake pedal traverses the brake pedal gap.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
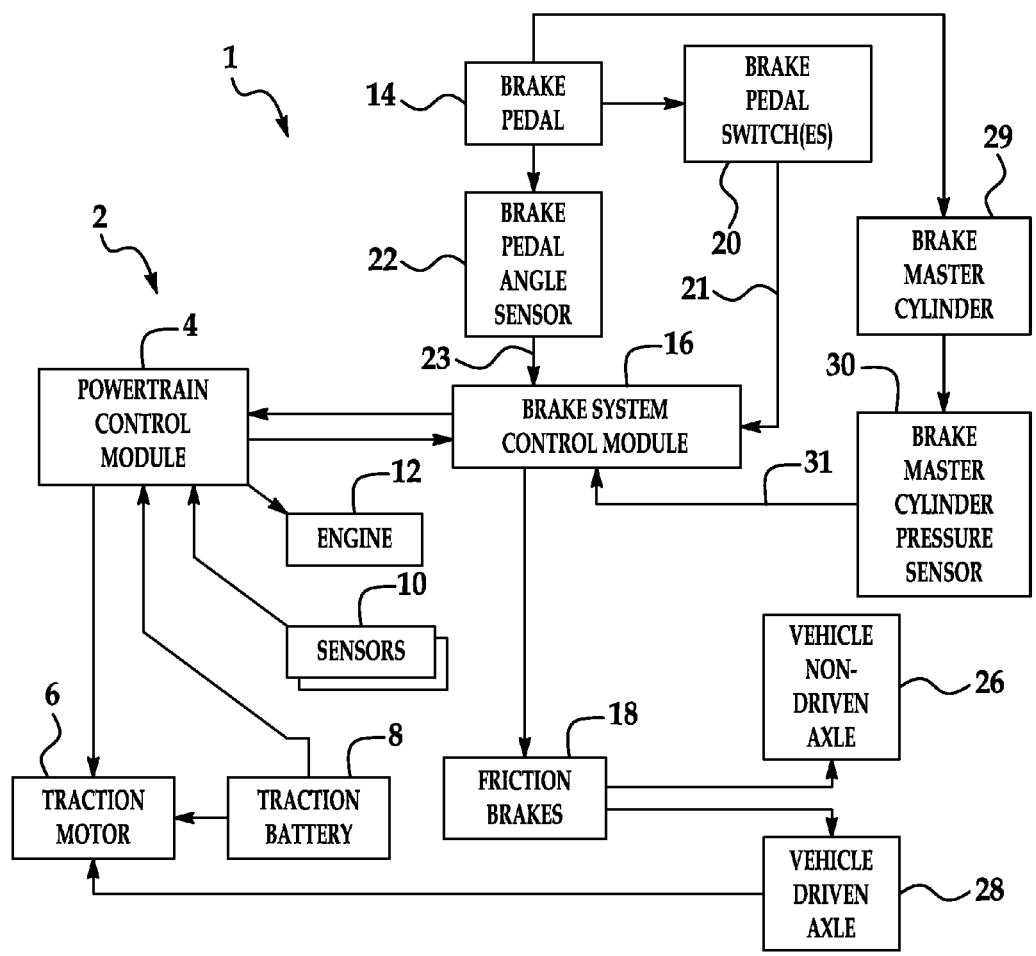
FIG. 1 is a functional block diagram of an illustrative embodiment of the regenerative braking control system.
Figure 2:
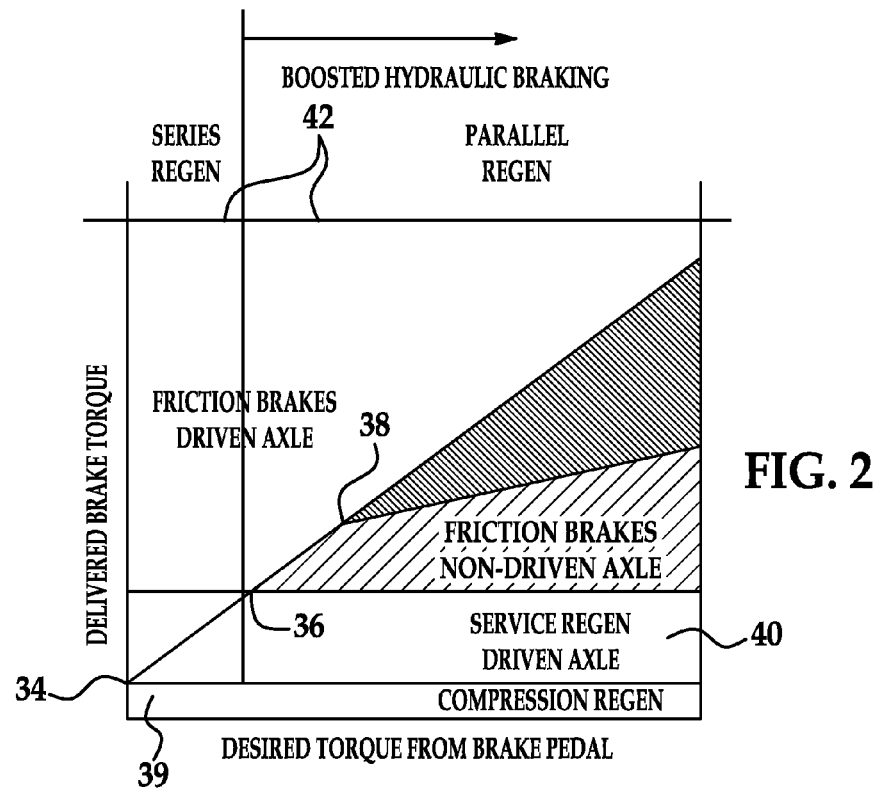
FIG. 2 is a graph which illustrates apportionment of regenerative braking and friction braking during a braking event responsive to the brake pedal angle reported by a Brake Pedal Angle Sensor (BPAS) in exemplary implementation of the regenerative braking control system.
Figure 3:
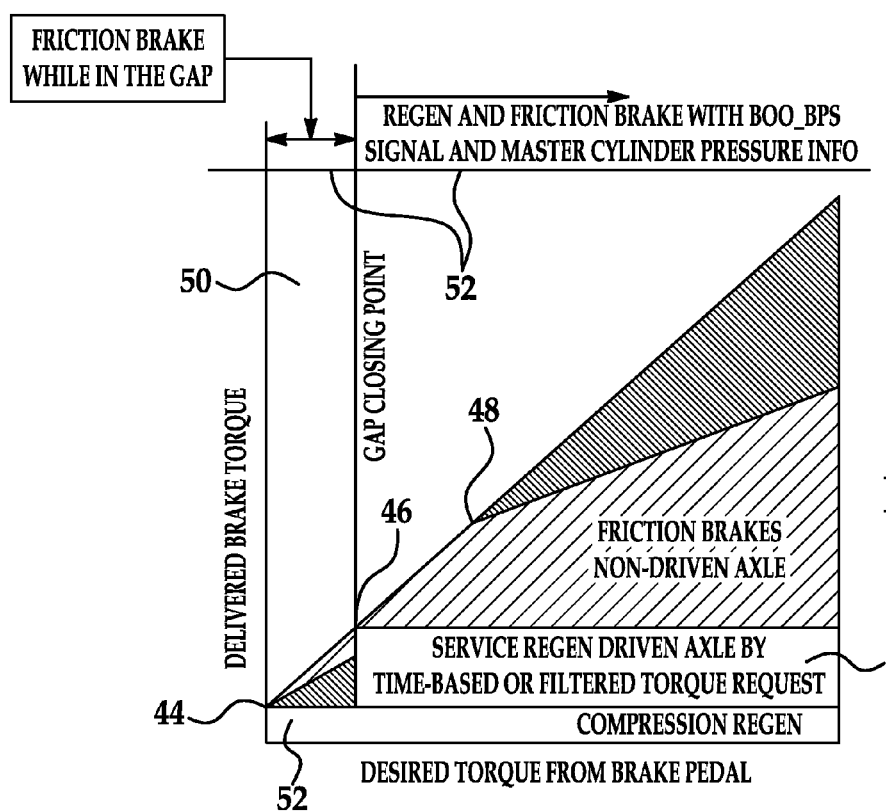
FIG. 3 is a graph which illustrates apportionment of regenerative braking and friction braking during a braking event responsive to brake pedal sensor and master cylinder pressure inputs in the absence of input from the BPAS in exemplary implementation of the regenerative braking control system.

Referring initially to FIGS. 1-3, an illustrative embodiment of the regenerative braking control system, hereinafter system, of a vehicle is generally indicated by reference numeral 1. The system 1 has a vehicle braking system 2 which may include a powertrain control module 4 and a brake system control module 16. A traction motor 6 may interface with the powertrain control module 4. A traction battery 8 may interface with the traction motor 6. A vehicle driven axle 28 may drivingly engage the traction motor 6. Powertrain control module sensors 10 may interface with the powertrain control module 4. In hybrid electric vehicles (HEVs), the powertrain control module 4 may interface with a vehicle engine 12.

The brake system control module 16 of the vehicle braking system 2 may interface with the powertrain control module 4. Friction brakes 18 may interface with the brake system control module 16. The friction brakes 18 may mechanically interface with a vehicle non-driven axle 26 and the vehicle driven axle 28. At least one brake pedal angle sensor (BPAS) 22 may interface with the brake system control module 16. A vehicle brake pedal 14 may mechanically engage the brake pedal angle sensor 22. At least one brake pedal switch 20 may interface with the vehicle brake pedal 14 and the brake system control module 16. During a braking event, the brake pedal switch 20 may transmit brake pedal input signal 21 to the brake system control module 16. The brake pedal input signal 21 may indicate the position of the brake pedal switch 20 to indicate that the vehicle operator is applying the vehicle brake pedal 14.

A brake master cylinder 29 may interface with the vehicle brake pedal 14. A brake master cylinder pressure sensor 30 may interface with the brake master cylinder 29. During the braking event, the brake master cylinder pressure sensor 30 may transmit pressure input 31 which indicate the master cylinder pressure of the brake master cylinder 29 to the brake system control module 16.

Upon application of the vehicle brake pedal 14 by the vehicle operator during a braking event, the BPAS 22 may provide brake pedal angle input signal 23 to the brake system control module 16. Based on the brake pedal angle input signal 23, the brake system control module 16, in conjunction with the powertrain control module 4, may use a software routine to control and apportion the friction braking which the friction brakes 18 apply to the vehicle non-driven axle 26 and/or the vehicle driven axle 28 and the regenerative braking which the powertrain control module 4 applies to the traction motor 6 of the vehicle. During regenerative braking, the vehicle driven axle 28 may drivingly engage the traction motor 6, which generates electrical power that is stored in the traction battery 8 to subsequently power the vehicle via the traction motor 6.

During the braking event, the BPAS 22 normally transmits the brake pedal angle input signal 23 to the brake system control module 16. As shown in FIG. 1 in conjunction with FIG. 2, throughout the braking event, the powertrain control module 4 may apply compression regenerative braking 39 and service regenerative braking 40 to the traction motor 6 via the vehicle driven axle 28. As the desired torque from the vehicle brake pedal 14 increases from the onset of the braking event 34 to a first point 36 within the brake pedal torque range 42, the powertrain control module 4 may use series regenerative braking. Beyond the first point 36, the powertrain control module 4 may switch from series regenerative braking to parallel regenerative braking.

As the desired torque from the vehicle brake pedal 14 increases from the first point 36 to a second point 38 within the brake pedal torque range 42, the brake system control module 16 may apply the friction brakes 18 to the vehicle non-driven axle 26. As the desired torque from the vehicle brake pedal 14 increases beyond the second point 38, the brake system control module 16 may apply the friction brakes 18 to both the vehicle non-driven axle 26 and the vehicle driven axle 28.

As shown in FIG. 1 in conjunction with FIG. 3, in the event that the brake system control module 16 does not receive the brake pedal angle input signal 23 from the BPAS 22 at the onset of the braking event 44, the brake system control module 16 may receive the brake pedal input signal 21 from the brake pedal switch 20. Additionally or alternatively, the brake system control module 16 may receive the pressure input 31 from the brake master cylinder pressure sensor 30. Using a software routine, the friction brakes 18 may apply friction braking to both the vehicle non-driven axle 26 and the vehicle driven axle 28 as the desired torque from the vehicle brake pedal 14 increases throughout a brake pedal gap 50 from the onset of the braking event 44 to a first point 46 in the brake pedal torque range 52. As the desired torque from the vehicle brake pedal 14 increases from the first point 46 to a second point 48 within the brake pedal torque range 52, the brake system control module 16 may cause the friction brakes 18 to apply friction braking at the vehicle non-driven axle 26 only. As the desired torque from the vehicle brake pedal 14 increases beyond the second point 48, the brake system control module 16 may cause the friction brakes 18 to apply friction braking at both the vehicle non-driven axle 26 and the vehicle driven axle 28.

Throughout the braking event, the powertrain control module 4 may apply compression regenerative braking 52 to the traction motor 6. Beyond the first point 46, the powertrain control module 4 may apply service regenerative braking 54 to the traction motor 6 via the vehicle driven axle 28. In some embodiments, the service regenerative braking 54 may be time-based or may be based on a filtered torque request.

Figure 4:
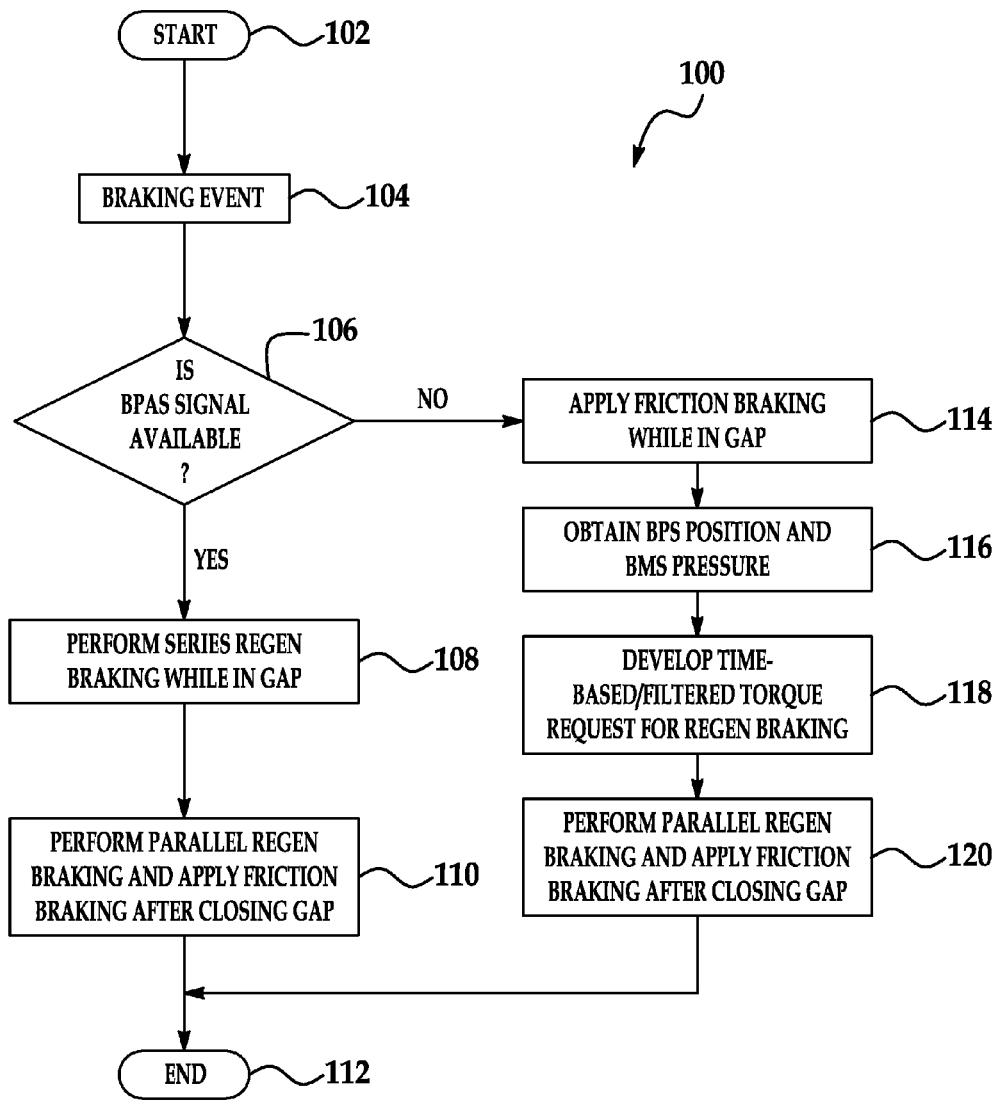
FIG. 4 is a flow diagram of an illustrative embodiment of the regenerative braking control method.

Referring next to FIG. 4, a flow diagram 400 of an illustrative embodiment of the regenerative braking control method is shown. The method may begin at block 102. At block 104, a braking event begins. At block 106, a determination is made as to whether a BPAS (Brake Pedal Angle Sensor) input signal is available. If a BPAS input signal is available, series regenerative braking may be implemented through an initial brake pedal gap in the brake pedal torque range at block 108. Parallel regenerative braking and friction braking may be implemented after the initial braking gap is closed at block 110. The method may end at block 112.

If a BPAS input signal is not available at block 106, friction braking may be implemented throughout the initial brake pedal gap at block 114. At block 116, brake pedal sensor (BPS) position and BMC (brake master cylinder) pressure may be obtained. At block 118, a time-based or filtered torque request for regenerative braking may be obtained. At block 120, parallel regenerative braking and friction braking may be implemented after the brake pedal gap is closed. The method may end at block 112.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A vehicle regenerative braking control system, comprising:
at least one controller comprising computer instructions stored in non-transitory memory, the at least one controller configured to implement friction braking and regenerative braking responsive to input from at least one of a brake pedal switch and a brake master cylinder pressure sensor as backup inputs causing the at least one controller to implement parallel regenerative braking and friction braking in the absence of a brake pedal angle input signal from a brake pedal angle sensor, the at least one controller configured to receive a brake pedal angle sensor signal from the brake pedal angle sensor including through an initial range of motion of the brake pedal corresponding to traversal of a brake pedal gap, the absence of the brake pedal angle input signal further causing the at least one controller to implement only friction braking during traversal of the brake pedal gap, the at least one controller further configured to apply series regenerative braking during traversal of the brake pedal gap and apply parallel regenerative braking and friction braking following traversal of the brake pedal gap if the brake pedal angle sensor signal is available.

2. The vehicle regenerative braking control system of claim 1 further comprising a brake system control module comprising computer instructions stored in non-transitory memory, the brake system control module interfacing with the at least one of a brake pedal switch and a brake master cylinder pressure sensor, and the brake system control module is configured to implement friction braking.

3. The vehicle regenerative braking control system of claim 2 further comprising friction brakes interfacing with the brake system control module and at least one vehicle axle interfacing with the friction brakes.

4. The vehicle regenerative braking control system of claim 3 wherein the vehicle braking system further comprises a powertrain control module comprising computer instructions stored in non-transitory memory, the powertrain control module interfacing with the brake system control module, and the powertrain control module is configured to implement regenerative braking.

5. The vehicle regenerative braking control system of claim 4 further comprising a traction motor interfacing with the powertrain control module and drivingly engaged by the at least one vehicle axle and a traction battery interfacing with the traction motor.

6. The vehicle regenerative braking control system of claim 1 wherein the at least one of a brake pedal switch and a brake master cylinder pressure sensor interfacing with a brake pedal and a vehicle braking system comprises the brake pedal switch interfacing with the brake pedal and the vehicle braking system.

7. The vehicle regenerative braking control system of claim 1 wherein the at least one of a brake pedal switch and a brake master cylinder pressure sensor interfacing with a brake pedal and a vehicle braking system comprises the brake master cylinder pressure sensor interfacing with the brake pedal and the vehicle braking system.

8. The vehicle regenerative braking control system of claim 1 wherein the at least one of a brake pedal switch and a brake master cylinder pressure sensor interfacing with a brake pedal and a vehicle braking system comprises the brake master cylinder pressure sensor and the brake master cylinder pressure sensor interfacing with the brake pedal and the vehicle braking system.

9. A regenerative braking control method by least one controller executing programmed instructions stored in non-transitory memory, comprising:
at least one controller executing programmed instructions stored in non-transitory memory to implement friction braking and regenerative braking responsive to input from at least one of a brake pedal switch and a brake master cylinder pressure sensor as backup inputs causing the at least one controller to implement parallel regenerative braking and friction braking in the absence of a brake pedal angle input signal from a brake pedal angle sensor, the at least one controller configured to receive a brake pedal angle sensor signal from the brake pedal angle sensor including through an initial range of motion of the brake pedal, the at least one controller further configured to initially apply series regenerative braking if the brake pedal angle sensor signal is available; and
developing a time-based torque request responsive to obtaining at least one of a brake pedal switch position and a brake master cylinder pressure and prior to performing at least one of parallel regenerative braking and friction braking.

10. The regenerative braking control method of claim 9 further comprising performing at least one of parallel regenerative braking and friction braking if the brake pedal angle input signal is available.

11. The regenerative braking control method of claim 9 further comprising developing a filtered torque request responsive to obtaining at least one of a brake pedal switch position and a brake master cylinder pressure and prior to performing at least one of parallel regenerative braking and friction braking.

12. The regenerative braking control method of claim 9 wherein performing at least one of parallel regenerative braking and friction braking comprises performing parallel regenerative braking and friction braking.

13. The regenerative braking control method of claim 9 wherein obtaining at least one of a brake pedal switch position and a brake master cylinder pressure if the brake pedal angle input signal is unavailable comprises obtaining a brake pedal switch position and a brake master cylinder pressure.

14. A regenerative braking control method by least one controller executing programmed instructions stored in non-transitory memory, comprising:
at least one controller executing programmed instructions stored in non-transitory memory to apply friction braking as a vehicle brake pedal traverses a brake pedal gap corresponding to an initial segment of a brake pedal torque range; and
performing at least one of parallel regenerative braking and friction braking, after the vehicle brake pedal traverses the brake pedal gap, based upon at least one of a brake pedal switch position and a brake master cylinder pressure as backup inputs causing the at least one controller to implement parallel regenerative braking and friction braking if a brake pedal angle sensor signal is unavailable, the at least one controller configured to receive a brake pedal angle sensor signal from the brake pedal angle sensor including through an initial range of motion of the brake pedal, the at least one controller further configured to initially apply series regenerative braking if the brake pedal angle sensor signal is available; and
developing a filtered torque request responsive to obtaining at least one of a brake pedal switch position and a brake master cylinder pressure and prior to performing at least one of parallel regenerative braking and friction braking.

15. The regenerative braking control method of claim 14 further comprising performing at least one of parallel regenerative braking and friction braking if the brake pedal angle sensor signal is available.

16. The regenerative braking control method of claim 14 further comprising developing a time-based torque request responsive to obtaining at least one of a brake pedal switch position and a brake master cylinder pressure and prior to performing at least one of parallel regenerative braking and friction braking.

17. The regenerative braking control method of claim 14 wherein performing at least one of parallel regenerative braking and friction braking comprises performing parallel regenerative braking and friction braking.

18. The regenerative braking control method of claim 14 wherein obtaining at least one of a brake pedal switch position and a brake master cylinder pressure if the brake pedal angle sensor signal is unavailable comprises obtaining a brake pedal switch position and a brake master cylinder pressure.

* * * * *